(12) United States Patent
Sano et al.

(10) Patent No.: US 9,534,613 B2
(45) Date of Patent: Jan. 3, 2017

(54) COMPRESSOR

(75) Inventors: Atsushi Sano, Hitachinaka (JP);
Hidetoshi Kuroki, Hitachi (JP);
Hironori Tsukidate, Hitachi (JP);
Hidetaro Murata, Hitachi (JP);
Nobuaki Kizuka, Hitachinaka (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 379 days.

(21) Appl. No.: 13/027,369

(22) Filed: Feb. 15, 2011

(65) Prior Publication Data

US 2011/0236195 A1 Sep. 29, 2011

(30) Foreign Application Priority Data

Mar. 29, 2010 (JP) .................................. 2010-074061

(51) Int. Cl.
*F04D 29/54* (2006.01)
*F01D 9/04* (2006.01)
(Continued)

(52) U.S. Cl.
CPC ............. *F04D 29/542* (2013.01); *F01D 9/042* (2013.01); *F01D 25/246* (2013.01);
(Continued)

(58) Field of Classification Search
CPC .......... F04D 29/526; F01D 9/04; F01D 9/041; F01D 9/042; F01D 9/044
(Continued)

(56) References Cited

U.S. PATENT DOCUMENTS 2,999,670 A 10/1956 Payne et al.
3,544,231 A * 12/1970 Zerlauth ................. F01D 5/187
415/115

(Continued)

FOREIGN PATENT DOCUMENTS

CN 1831297 A 9/2006
CN 101008328 A 8/2007
(Continued)

OTHER PUBLICATIONS

LM2500 Marine Gas Turbine .pdf.*
European Search Report dated Jun. 12, 2014 (Seven (7) pages).

*Primary Examiner* — Christopher Verdier
*Assistant Examiner* — Brian O Peters
(74) *Attorney, Agent, or Firm* — Crowell & Moring LLP

(57) ABSTRACT

It is an object of the present invention to provide a compressor that has a simple structure, produces a damping effect and improves aerodynamic performance.
In a compressor including stator blades 4 circumferentially mounted to an inner circumferential surface side of a casing 6 forming a annular path; and an inner barrel 7 supported by the casing and arranged on the radially inside of the stator blade as a partition wall on the radial side of the annular path; the stator blade includes an outer shroud 10 mounted to an inner circumferential surface of the casing at a position facing the inner barrel, and an inner shroud 11 supporting a blade portion at an inner diameter side, the inner shroud being disposed in an annular groove formed in an outer circumferential surface of the inner barrel facing the inner shroud. The stator blade including the outer shroud 10, the inner shroud 11 and the blade portions 9 are formed in a monolithic structure by milling.

1 Claim, 4 Drawing Sheets

(51) Int. Cl.
*F04D 29/02* (2006.01)
*F01D 25/24* (2006.01)
*F01D 11/00* (2006.01)

(52) U.S. Cl.
CPC .......... *F04D 29/023* (2013.01); *F01D 11/001* (2013.01); *F05D 2230/14* (2013.01); *Y02T 50/673* (2013.01)

(58) Field of Classification Search
USPC ........................................................ 415/193
See application file for complete search history.

(56) References Cited

U.S. PATENT DOCUMENTS

| | | | |
|---|---|---|---|
| 4,645,417 A * | 2/1987 | Wisler ........................ | 415/173.1 |
| 4,897,021 A * | 1/1990 | Chaplin et al. ............. | 415/173.7 |
| 6,655,913 B2 * | 12/2003 | Vedantam et al. ......... | 415/214.1 |
| 6,732,530 B2 * | 5/2004 | Laurello et al. ............. | 60/782 |
| 7,195,453 B2 | 3/2007 | Martin et al. | |
| 7,341,427 B2 * | 3/2008 | Farmer et al. ............... | 415/191 |
| 8,894,370 B2 * | 11/2014 | Wassynger et al. ....... | 416/220 R |
| 2006/0198726 A1 | 9/2006 | Schirle et al. | |
| 2007/0177973 A1 | 8/2007 | Seki et al. | |
| 2010/0098537 A1 | 4/2010 | Hamana | |

FOREIGN PATENT DOCUMENTS

| | | |
|---|---|---|
| JP | 8-284607 A | 10/1996 |
| JP | 2006-250147 A | 9/2006 |
| JP | 2007-198293 A | 8/2007 |
| WO | WO 2009/001415 A1 | 12/2008 |
| WO | WO 2009/048455 A1 | 4/2009 |

\* cited by examiner $P_1 < P_2$

COMPRESSOR

BACKGROUND OF THE INVENTION

1. Field of the Invention

The present invention relates to a compressor.

2. Description of the Related Art

A compressor undergoes a large pressure load on the high-pressure side, while a blade is subject to vibration stress because of an exciting force resulting from possible irregular pressure variations occurring at the time of start-up.

For this reason, the following structure as described in e.g. JP-2007-193293-A has generally been employed. In a stator blade single-body where an outer shroud and an inner shroud are integrally formed, a plurality of stator blades adjacent circumferentially to each other are held with bolts by use of a seal holder. The seal holder is axially-halved and has a circumferential length of the inner shroud. In this way, rigidity is increased to improve damping relative to blade vibration.

SUMMARY OF THE INVENTION

In the case of the structure described in JP-2007-198293-A, a bolt fastening portion securing the seal holder is liable to slacken due to vibrations during work. Further, since an assembly structure is complicated, the flexibility of a shape is small. Furthermore, it is necessary to ensure a space adapted to mount the seal holder.

In the future, a gas turbine will be expected to be increased in an amount of air therefor due to further increase in capacity thereof, and in a pressure load and in air temperature due to an increased pressure ratio for performance improvement. Therefore, a high-performance compressor stator blade structure is required that has a simpler structure, high-flexibility of a shape, and a damping effect.

It is an object of the present invention to provide a compressor that has a simple structure, provides a damping effect and improves aerodynamic performance.

According to an aspect of the present invention, there is provided a compressor including stator blades circumferentially mounted. to en inner circumferential surface side of a casing forming a annular path; and an inner barrel supported by the casing and arranged on the radially inside of the stator blade as a partition wall on the radial side of the annular path; wherein the stator blade includes an outer circumferential shroud mounted to an inner circumferential surface of the casing at a position facing the inner barrel, and an inner shroud supporting a blade portion at an inner diameter side, the inner shroud being disposed in a space of a groove portion circumferentially formed in an outer circumferential surface of the inner barrel facing the inner shroud, and wherein the stator blade including the outer shroud, the inner shroud and the blade portions are formed in a monolithic: structure by milling.

The present invention can provide a compressor that can produce a damping effect with a simple structure and improve aerodynamic performance.

DESCRIPTION OF THE PREFERRED EMBODIMENTS

Figure 1:
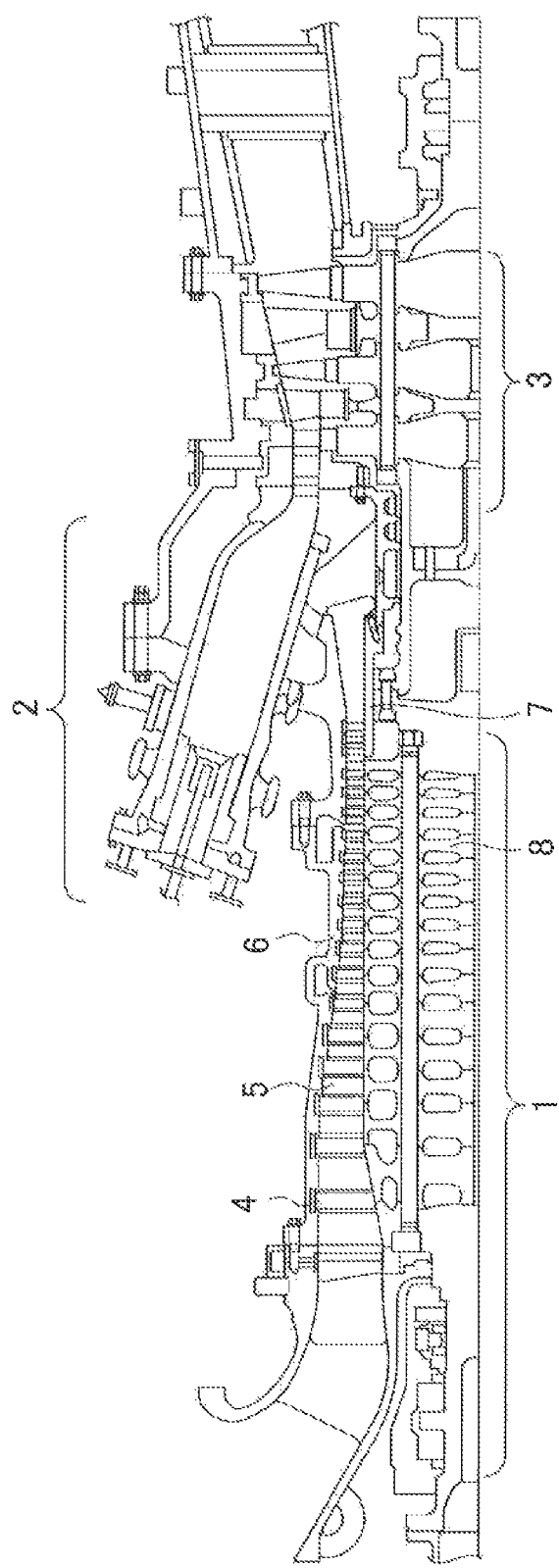
FIG. 1 is a structural cross-sectional view of a gas turbine.

FIG. 1 is a structural cross-section of a gas turbine by way of example. The gas turbine mainly includes a compressor 1, a combustor 2 and a turbine 3. The compressor 1 sucks air from the atmosphere and adiabatically compresses such air as working fluid, The combustor 2 mixes fuel with the compressed air supplied from the compressor 1 for combustion, thereby generating high temperature and high pressure gas. The turbine 3 generates rotative power during the expansion of the combustion gas introduced from the combustor 2.

Figure 2:
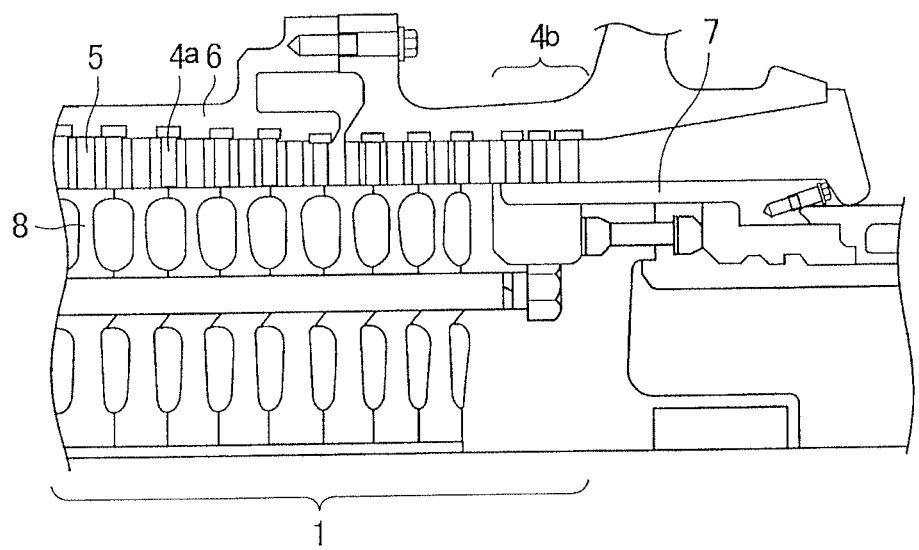
FIG. 2 is an enlarged view of an outlet portion of a compressor shown in FIG. 1.

The compressor 1 shown in FIG. 2 is a constituent element of the gas turbine and is composed of stator blades that include stage portion stator blades 4a and adjusting portion stator blades 4b, rotor blades 5 and a wheel 8 which is a rotating shaft. The rotor blades 4a are configured such that a plurality of implant portions formed on the root sides (radially external sides) of the blade portions are fixedly inserted into a circumferential groove portion provided on the inner circumferential side of a casing 6 in the circumferential direction of the rotating shaft of the compressor. A plurality of the rotor blades 5 are mounted to the wheel 8 side in the circumferential direction of the wheel and rotated by the drive of the wheel 8. The plurality of stator blades 4a annularly mounted to the casing 6 in the circumferential direction thereof and the plurality of rotor blades 5 annularly mounted to the wheel 8 are axially arranged in plural rows. These stator blade rows and rotor blade rows are alternately arranged in the flow direction of fluid (air) to form stages.

Referring to FIG. 2, a plurality of rows, e.g. continuous three rows, of the stator blades 4b are arranged in the flow direction of fluid (in the axial direction) on the high-pressure (outlet) side of the compressor 1. These high-pressure side stator blades 4b are installed in order to adjust the flow of the compressed air increased in pressure at stage portions composed of stator blade rows and rotor blade rows on the upstream side thereof. An inner barrel 7 supported by the casing 6 is provided on the radially inside of the stator blades for flow-adjustment. The inner barrel 7 is installed as an inner radial side partition wall (inner tube) of an annular path formed by the casing 6.

Figure 3:
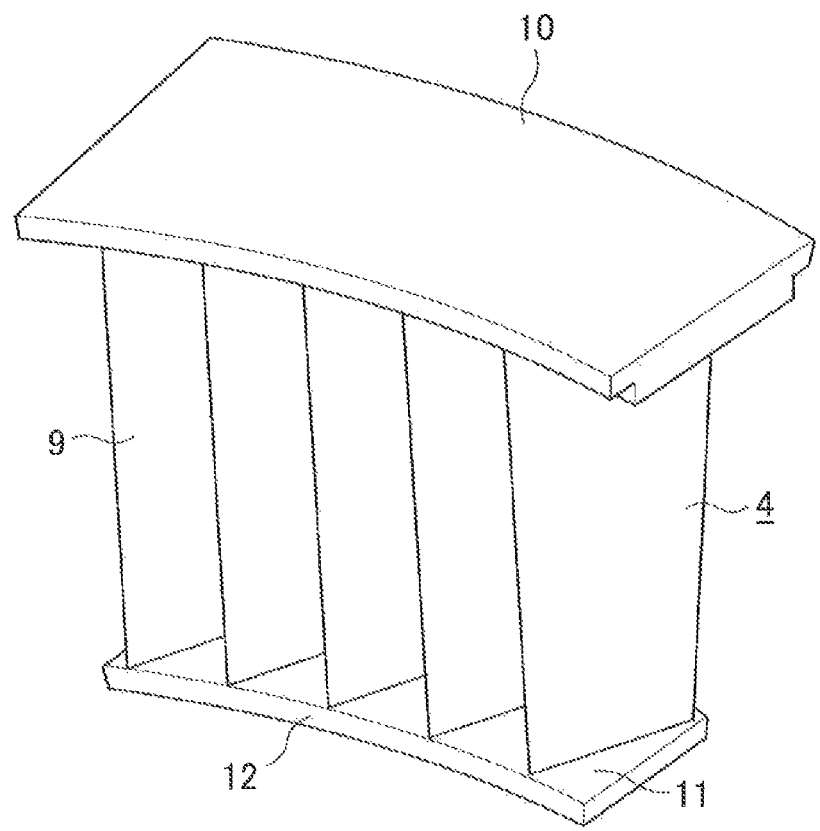
FIG. 3 is a perspective view of a stator blade ring segment.
Figure 4:
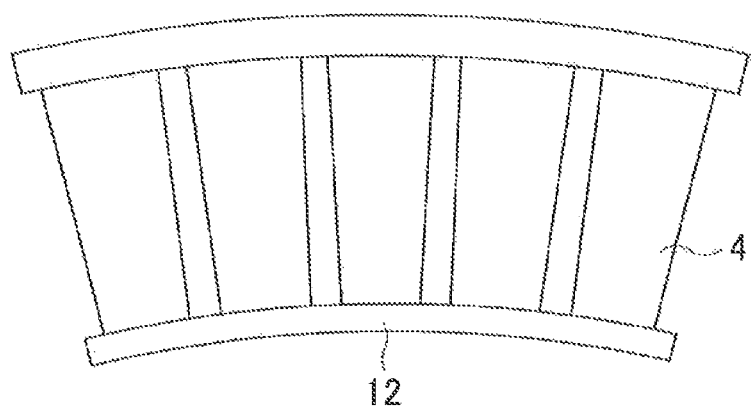
FIG. 4 illustrates the stator blade ring segment as viewed in an axial direction.

A stator blade structure of the present embodiment is next described with reference to FIGS. 3 and 4. The stator blades of the present invention, here generally identified by reference number 4, are composed as a stator blade ring segment 12 in which a plurality of blade portions 9 are formed integrally with an outer shroud 10 and an inner shroud 11. The stator blade ring segment 12 is formed in a monolithic structure including the blade portions 9, the outer shroud 10 and the inner shroud 11 by milling machine. In addition, the stator blade ring segment 12 is mounted by inserting the implant portions of the outer shroud 10 into the circumferential groove portion of the casing 6. In this way, the ring-shaped stator blade ring is formed by sequentially inserting a plurality of the stator blade ring segments 12.

In the present embodiment as described above, the stator blades of the compressor can be made as a damping structure with increased rigidity by being monolithically formed as the stator blade ring segment.

Figure 5:
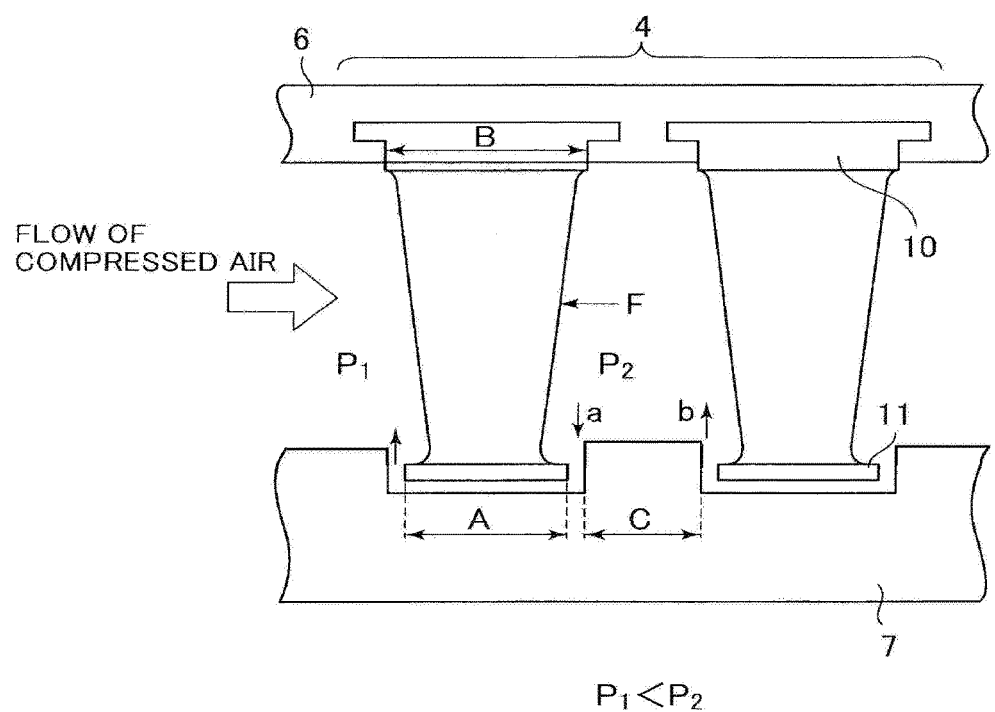
FIG. 5 is an enlarged. view of the outlet portion of the compressor.

A description is next given of an effect of reducing an amount of compressed air leaking from the high-pressure side to the low-pressure side with reference to FIG. 5. In the present embodiment, a plurality of the stator blades for flow-adjustment are arranged axially and continuously at a position facing the inner barrel 7, The inner barrel 7 facing the inner shroud 11 is circumferentially formed with an annular groove with a given depth on the outer circumferential side thereof. When the stator blades 4 (the stator blade ring segment 12) are mounted to the casing 6, part of or the entire inner shroud His disposed in the space of the annular groove. Incidentally, the inner shroud 11 is not in contact with the inner barrel 7, i.e., is disposed with a given gap therebetween.

In the compressor configured as described above, in order to avoid interference between suction air "a" from a gap formed between the inner barrel 7 and the inner shroud 11 of a stator blade, and blow air "b" from a gap formed between the inner barrel 7 and a stator blade on the downstream side of the former stator blade (the high-pressure side), it is necessary to ensure a. distance C between an stator blade row and the stator blade row on the downstream side of the former stator blade row as much as possible. For this reason, it is necessary to minimize the axial length. A of the inner shroud 11. However, in the conventional art having the complicated structure as described in JP-2007-198293-A, it is difficult to reduce the axial length A of the inner shroud 11.

On the other hand, in the stator blade structure of the present embodiment, the outer shroud 10, the blade portion 9 (profile) and the inner shroud 11 are formed in a monolithic structure by milling. Therefore, it is possible to fabricate the inner shroud 11 so as to make the axial length A minimum and precise. Further, the inner shroud 11 has no separate part, i.e., is formed as a single piece; therefore, the axial length A can be minimized.

The stator blade is tilted due to high-pressure side gas force F from the outer shroud 10 as a basic point toward the low-pressure side (upstream side). In this case, if the axial length A of the inner shroud 11 is large, the inner shroud 11 is shifted from an annular groove of the inner barrel 7 into a gas path, which leads to deterioration in performance. However, the structure of the present embodiment can minimize the shift of the inner shroud 11 into the gas path; therefore, aerodynamic performance can be improved.

As described above, the stator blade of the present embodiment is formed in a monolithic structure by milling machining the stator blade ring segment, which is composed of the plurality of stator blades circumferentially adjacent to each other, the outer shroud and the inner shroud both having the circumferential length. A plurality of the stator blade ring segments are inserted into the groove circumferentially provided in the casing. In this way, the ring-shaped stator blade ring is formed, In addition, a plurality of the stator blade rings are continuously arranged in the axial direction. Such a monolithically formed stator blade ring segment can provide the damping structure with increased rigidity.

The inner shroud of the continuously arranged stator blade rings is disposed so as to be spaced apart from, i.e., so as not to be in contact with, the bottom of the groove provided in the outer circumference of the inner barrel. In addition, the axial width of the inner shroud is reduced to increase the interval of the groove provided in the inner barrel. In this way, the amount of compressed air leaking from the downstream side of high pressure to the upstream side of low pressure through the groove can be minimized to allow for maintaining performance. Further, because of simple structure, the flexibility of the shape can sufficiently be ensured.

What is claimed is:

1. A compressor comprising:

stage portions composed of stator blade rows and rotor blade rows; and an adjusting portion configured to adjust a flow of a compressed air increased in pressure at the stage portions, wherein the adjusting portion comprises:

outlet side stator blades circumferentially mounted to an inner circumferential surface side of a casing forming an annular path; and an inner barrel forming a stationary body supported by the casing, and arranged radially inside of the outlet side stator blades on the outlet side of a last stage of the stage portions as a partition wall on a radial side of the annular path;

wherein the inner barrel comprises annular grooves formed circumferentially in its outer circumferential surface, wherein the outlet side stator blades respectively include an outer shroud mounted to an inner circumferential surface of the casing at a position facing the inner barrel, and an inner shroud supporting a blade portion at an inner diameter side and facing the inner barrel, the inner shrouds being individually disposed in a space of a corresponding annular groove of the annular grooves, and each of the inner shrouds being disposed with a given gap between the inner barrel, wherein the outlet side stator blades are continuously arranged in an axial direction, wherein the outlet side stator blades, including the outer shroud, the inner shroud and the blade portion, are machined in a monolithic structure, wherein a plurality of the outlet side stator blades adjacent circumferentially to each other are monolithically formed as a stator blade ring segment, and a plurality of the stator blade ring segments are mounted to the casing in the circumferential direction thereof to form a ring-shaped stator blade ring, wherein a plurality of stator blade rings are axially arranged at a position located on the outlet side of the last stage of the stage portions and facing the inner barrel, and wherein the inner shrouds of all of the plurality of stator blade rings are individually and entirely disposed in the corresponding annular groove and do not contact the inner barrel.

* * * * *